United States Patent

Guard

[11] Patent Number: 5,237,333
[45] Date of Patent: Aug. 17, 1993

[54] METHOD AND APPARATUS FOR AMBIGUITY RESOLUTION IN A ROTATING INTERFEROMETER WHEEL

[75] Inventor: Glenn B. Guard, Laurel, Md.

[73] Assignee: Westinghouse Electric Corp., Pittsburgh, Pa.

[21] Appl. No.: 910,855

[22] Filed: Jul. 6, 1992

[51] Int. Cl.⁵ .............................................. G01S 5/02
[52] U.S. Cl. .................................. 342/424; 342/430
[58] Field of Search ............... 342/424, 430, 428, 442, 342/443, 449

[56] References Cited

U.S. PATENT DOCUMENTS

| | | | |
|---|---|---|---|
| 3,005,199 | 10/1961 | Grandsard | 342/424 |
| 3,670,332 | 6/1972 | Blommendaal | 342/430 |
| 4,136,342 | 1/1979 | Alcock et al. | 342/424 |
| 4,845,502 | 7/1989 | Carr et al. | 342/430 |
| 4,975,710 | 12/1990 | Baghdady | 342/442 |
| 5,099,248 | 3/1992 | Brommer | 342/430 |

OTHER PUBLICATIONS

U.S. patent application Ser. No. 07/597/476 entitled Method And Apparatus for Ambiguity Resolution In A Rotating Interferometer.
U.S. patent application entitled Method And Apparatus for Determining The Angle of Arrival of a Radar Signal At A spinning Interferometer.

Primary Examiner—Mark Hellner
Attorney, Agent, or Firm—W. G. Sutcliff

[57] ABSTRACT

Precise azimuth and elevation angles of arrival of a signal are determined using a rotating interferometer wheel rotatable about an axis parallel to the boresight of the interferometer. The angles of arrival are determined based on the measured phase differences of signals received by the interferometer, corresponding cone angles and the assignment of azimuth and elevation values to the group of conic lines which are nearest each other.

5 Claims, 4 Drawing Sheets 5,237,333

METHOD AND APPARATUS FOR AMBIGUITY RESOLUTION IN A ROTATING INTERFEROMETER WHEEL

CROSS REFERENCE TO RELATED APPLICATIONS

This application is related to co-pending application having U.S. Ser. No. 07/597,476, filed Oct. 12, 1990 and entitled METHOD AND APPARATUS FOR AMBIGUITY RESOLUTION IN A ROTATING INTERFEROMETER by Glenn Barry Guard, the application being assigned to the assignee of the subject application, Westinghouse Electric Corporation and incorporated by reference herein.

BACKGROUND OF THE INVENTION

1. Field of the Invention

The present invention relates to electromagnetic direction finding and, more particularly, to determining the azimuth and elevation angle of an emitter using a rotating interferometer wheel.

2. Description of the Related Art

In known interferometer direction finding systems, a phase difference between signals received at two antennas is used to determine the angle of arrival of a signal at the interferometer. One such system is disclosed in U.S. Pat. No. 4,845,502 to Carr et al. In such a system, however, the measured phase difference becomes ambiguous as the distance between the two antennas increases beyond $\lambda/2$. This problem is schematically illustrated in the FIG. 1 diagram. In FIG. 1, antennas 10 and 15 receive a signal at a given angle $\phi$. As the distance S increases beyond $\lambda/2$, the measured phase difference $\psi_j$ becomes ambiguous and is expressed by the following:

$$\psi_j = (2\pi S/\lambda) \cos \phi \, modulo \, 2\lambda \qquad (1)$$

where $\phi$ represents a cone angle corresponding to the true unambiguous phase difference and $\lambda$ is the wavelength. Of course, it is possible to physically position the antennas 10 and 15 so that they are spaced not more than $\lambda/2$ apart, if the antennas are sufficiently physically narrow. However, a shorter spacing yields less direction finding accuracy than a longer spacing. In typical systems a large bandwidth is normally desirable such as in the range of 2-18 GHz. To obtain such a bandwidth, a common spiral antenna has a diameter of approximately 2 inches. However, the wavelength at 18 GHz is about 0.656 inches. Thus, an interferometer with a bandwidth in the range of, for example, 2-18 GHz would have the antennas spaced more than three wavelengths apart at 18 GHz, if the antennas were placed as closely together as physically possible. Consequently, the measured phase $\psi_j$ would not unambiguously correspond to a cone angle.

SUMMARY OF THE INVENTION

It is an object of the present invention to provide a method and apparatus for ambiguity resolution in a rotating interferometer wheel.

It is another object of the present invention to provide a method and apparatus for resolving the above-noted phase ambiguity problem in a rotating interferometer having a fixed heading and variable roll angle.

To achieve the above and other objects, the present invention provides an apparatus performing a method comprising the steps of receiving signals at multiple roll angles (positions or orientations) of an interferometer wheel having a boresight and rotating about an axis parallel to the boresight, measuring frequency and phase differences of signals received at the multiple roll positions of the interferometer, determining a set of cone angles based on the measured phase difference at each of the multiple roll positions, determining the groups of conic line intersections for each set of conic lines using one conic line from each ambiguous phase measurement, determining azimuth/elevation proximity for each group of conic line intersections, and assigning azimuth and elevation values to the group of conic lines which are nearest each other, thereby determining the arrival angle of the source signal. Multiple arrival angle determinations as the interferometer platform is translated or moved along a path would allow for location of the source emitter to be determined by triangulation.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
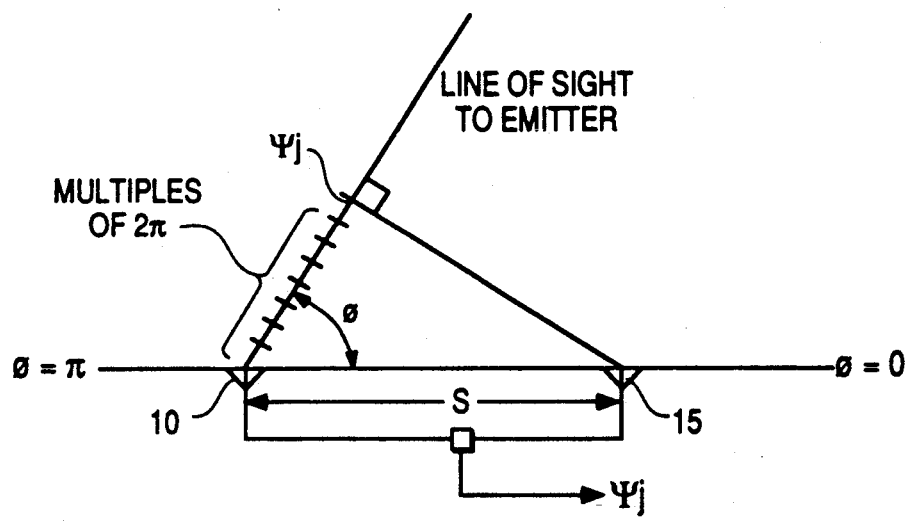
FIG. 1 schematically illustrates the geometric relationships in a two element interferometer.
Figure 2:
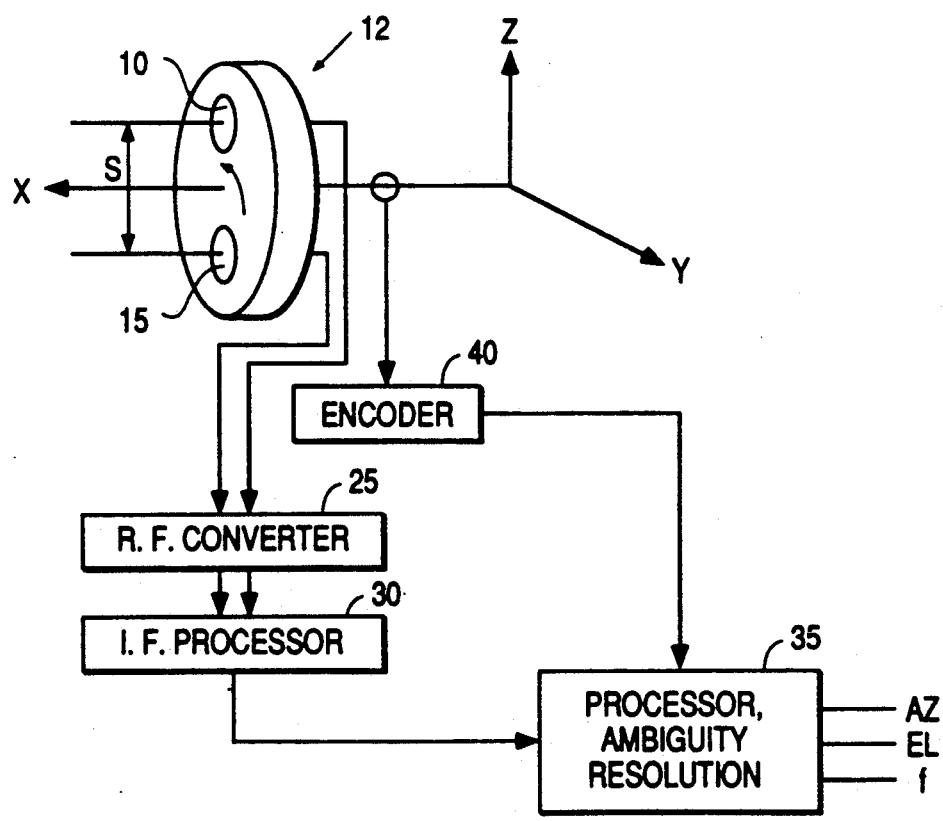
FIG. 2 is a schematic block diagram of a rotating interferometer, wheel system that embodies the present invention.

Referring to FIG. 2, an interferometer 12 rotates about an axis that coincides with the X axis of the coordinate system. In this system, the boresight of the interferometer 12 is parallel to and aligned with the X axis. The antennas 10 and 15, therefore, have a variable roll angle about the X axis as the interferometer 12 rotates.

Signals received at the antennas 10 and 15 are applied to a conventional radio frequency converter 25. The frequency of the signals received by the interferometer 12 can be, but is not limited to the range of 2 GHz-18 GHz. The RF converter 25 converts the signals to an intermediate frequency, and applies these signals to an intermediate frequency processor 30. The intermediate frequency processor 30 determines the frequency of the received signals and measures the phase differences $\psi_j$ of a signal received at the antennas 10 and 15. Any measured phase difference $\psi_j$ is a modulo $2\pi$ phase difference.

A processor 35 resolves the phase ambiguity inherent in the measured modulo $2\pi$ phase difference, and provides signals corresponding to the azimuth and elevation of an emitter, as well as a signal indicating a frequency of the signal received by the antennas 10 and 15. An encoder 40 provides the processor 35 with a signal indicating the roll angle of the interferometer 12 at the time when the signal being processed was received by the interferometer 12. As will be recognized by those skilled in the art, the RF converter 25, the IF processor 30 and encoder 40 can comprise any conventional RF converter, IF processor and encoder while the processor 35 can be a general purpose computer, a programmable digital signal processor or hardwired specialized digital signal processor. An Intel 80486 is an appropriate general purpose computer.

Figure 3:
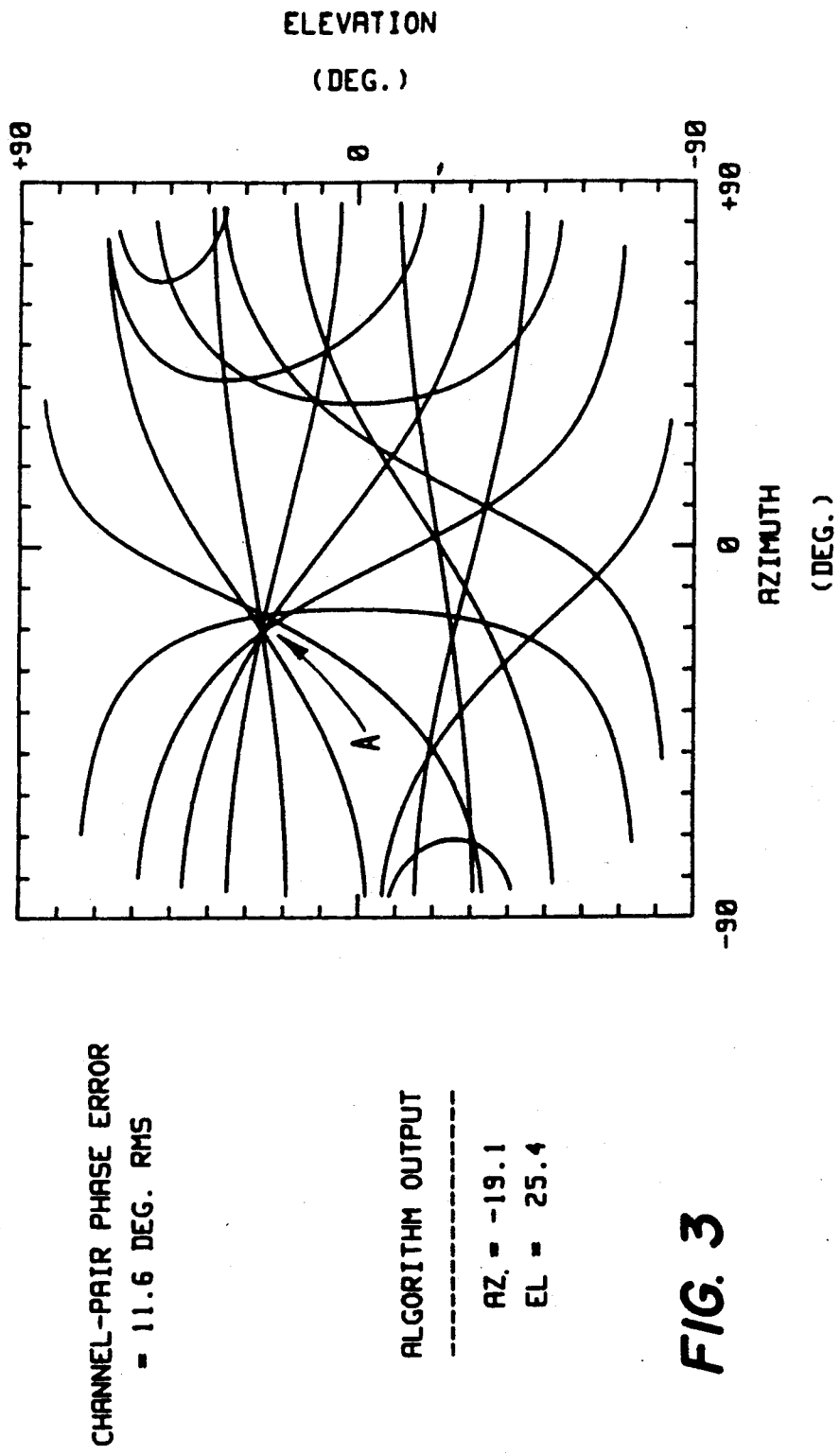
FIGS. 3 and 4 are graphs illustrating possible azimuth and elevation angles of a received signal.
Figure 4:
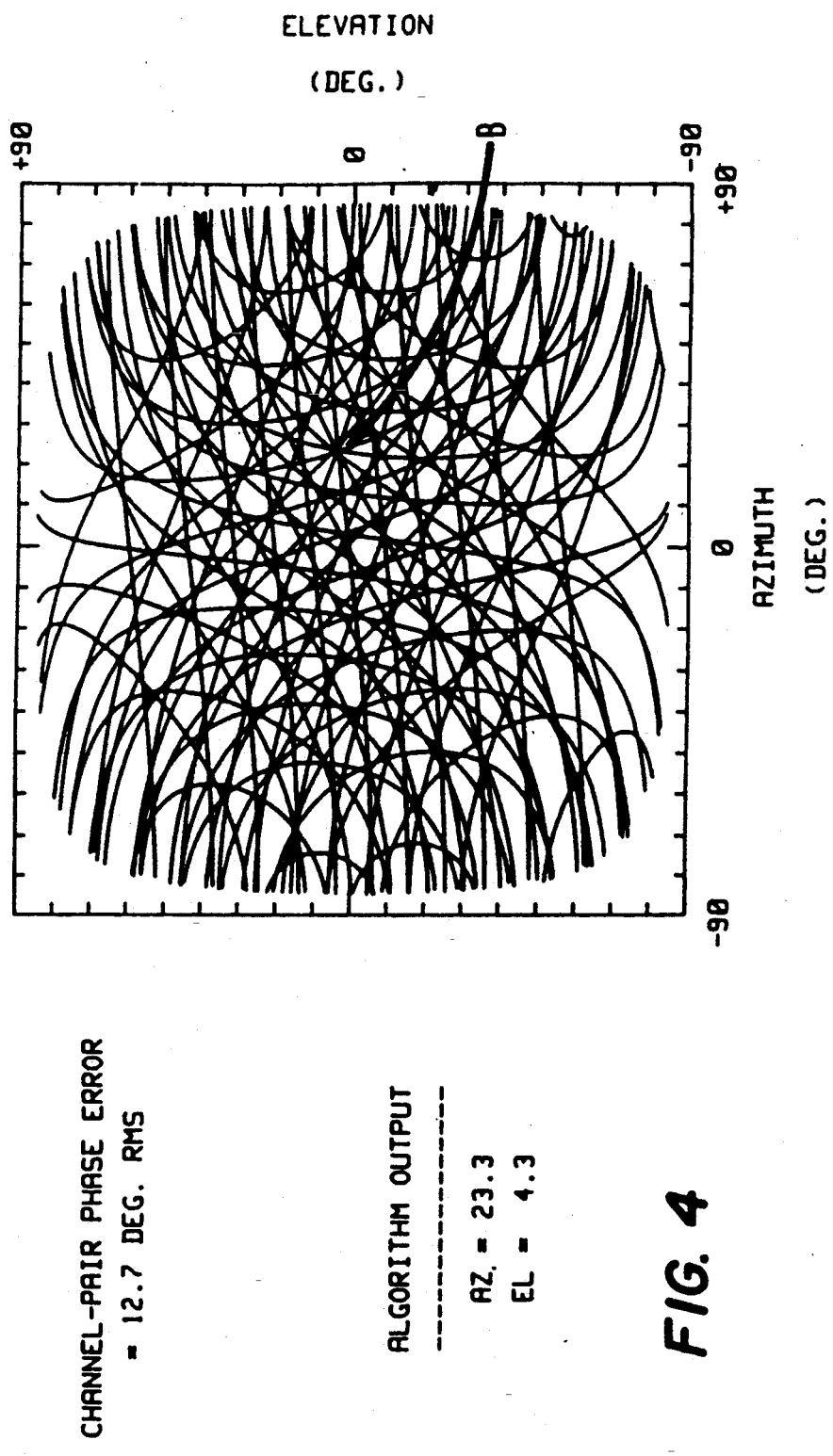

In accordance with the present invention, IF processor 30 performs phase measurements of signals received at antennas 10 and 15 at multiple roll positions of these antennas. As shown in FIGS. 3 and 4, in one embodiment of the present invention, 7 pulses are received at 25 degrees of roll per pulse. The present invention, however, is not limited to obtaining measurements at fixed or specific degree intervals, and could be based upon intervals of time. In addition, it is not necessary that the time interval or the angular interval be constant. The processor 35 uses the measured (i.e., ambiguous) differential phases $\psi_j$ to determine the possible values of differential unambiguous phases that could have yielded the measured ambiguous differential phase. For each measured phase the processor 35 develops a set of possible differential unambiguous phases that could have yielded the measured ambiguous differential phase $\psi_j$ in accordance with the following:

$$\psi_{j,k} = \psi_j + 2\lambda k \quad (2)$$

for $k = \ldots, -3, -2, -1, 0, 1, 2, 3, \ldots$ and $j = 1, 2, 3, \ldots$, such that $|\psi_{j,k}| \leq 2\pi s/\lambda$.

Therefore, for each roll position of the interferometer 12 at which a signal is measured by the IF processor 30, the processor 35 develops a set of possible differential unambiguous phases that could have resulted in the measured phase in accordance with the above equation. Thus, as the interferometer 12 rotates about the X axis through various roll angles multiple sets of $\psi_{j,k}$ are developed. Each of the $\psi_{j,k}$ is related to a cone angle $\phi_{j,k}$ in accordance with the following:

$$\phi_{j,k} = \cos^{-1}(\lambda \psi_{j,k}/2\pi S) \quad (3)$$

The direction from which signals are received by the antennas 10 and 15 is typically specified by an azimuth angle and an elevation angle. The set of cone angles $\phi_{j,k}$ are related to possible azimuth angles of arrival and elevation angles of arrival by the following:

$$Azimuth = A = \tan^{-1}(Q5/Q4) \quad (4)$$

$$Elevation = E = \cos^{-1}(Q6) - \pi/2 \quad (5)$$

where $$Q_4 = T_1 Q_1 + T_2 Q_2 + T_3 Q_3 \quad (6)$$

$$Q_5 = T_4 Q_1 + T_5 Q_2 + T_6 Q_3 \quad (7)$$

$$Q_6 = T_7 Q_1 + T_8 Q_2 + T_9 Q_3 \quad (8)$$

where $$Q_1 = \cos A_s \sin (E_s + \pi/2) \quad (9)$$

$$Q_2 = \sin A_s \sin (E_s + \pi/2) \quad (10)$$

$$Q_3 = \cos (E_s + \pi/2) \quad (11)$$

where $$T_1 = \cos H \cos P \quad (12)$$

$$T_2 = \cos H \sin P \sin R_j - \sin H \cos R_j \quad (13)$$

$$T_3 = \cos H \sin P \cos R_j + \sin H \cos R_j \quad (14)$$

$$T_4 = \sin H \cos P \quad (15)$$

$$T_5 = \sin H \sin P \sin R_j + \cos H \cos R_j \quad (16)$$

$$T_6 = \sin H \sin P \cos R_j - \cos H \sin R_j \quad (17)$$

$$T_7 = -\sin P \quad (18)$$

$$T_8 = \cos P \sin R_j \quad (19)$$

$$T_9 = \cos P \cos R_j \quad (20)$$

where H is the heading of the interferometer, P is the pitch of the interferometer, $R_j$ is the roll angle of the interferometer during the $j^{th}$ phase measurement and where $$-\pi/2 \leq E_s \leq \pi/2 \quad (21)$$

$$A_s = \tan^{-1}[\alpha/\sqrt{(1-\alpha^2)}] \quad (22)$$

$$\alpha = \lambda \psi_{j,k}/2\pi S \cos (E_s) = \sin \phi_{j,k} \quad (23)$$

Where $E_s$ is elevation angle in sensor coordinates, that is, elevation with respect to a plane containing the interferometer boresight line and which passes through the phase centers of the two antennas. The roll angles are provided by the encoder 40 shown in FIG. 2, and the azimuth and elevation angles are determined by the processor 35 shown in FIG. 2.

FIG. 3 graphically illustrates the possible azimuth angles and elevation angles that satisfy equation 3. FIG. 3 illustrates a case where pulses or measurements were obtained at 25 degree intervals of roll rotations by the interferometer 12 about the X axis shown in FIG. 2. Each pulse results in a set of curves or cone lines. The frequency of the received signal illustrated in FIG. 3 is 2 GHz, and the distance S is 7 inches. With the initial interferometer roll being −149.8 degrees. In the examples shown in FIGS. 3 and 4, the azimuth and elevation directions of arrival are indicated by converging conic lines which are identified in the vicinities of points A and B, respectively. Nominal channel-pair phase errors were used in the generation of the conic lines shown in FIGS. 3 and 4.

Figure 5:
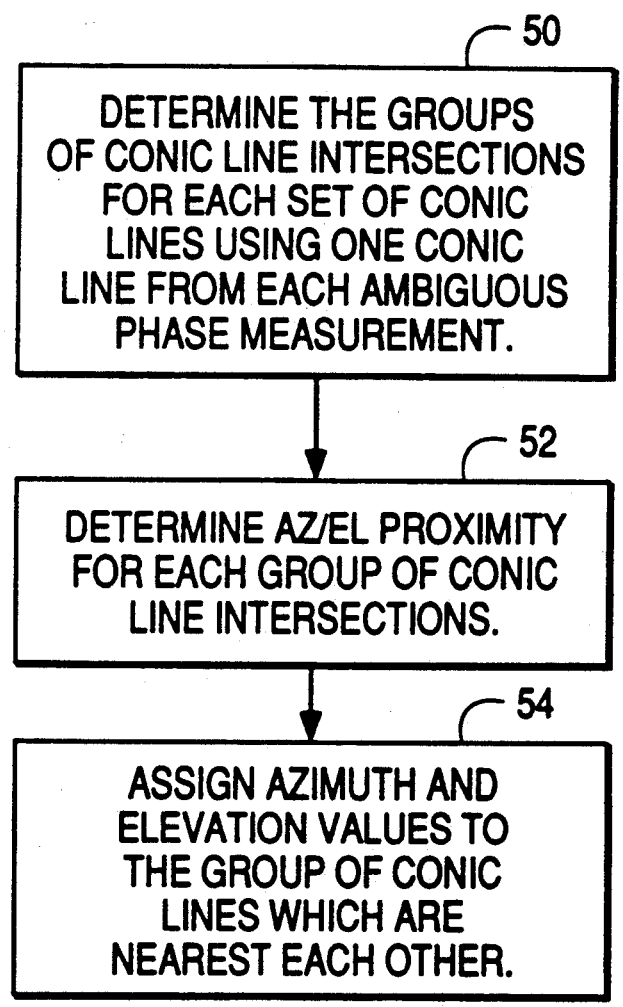
FIG. 5 is a flow diagram of ambiguity resolution in accordance with the present invention.

FIG. 5 illustrates the logic flow for selecting the angle of arrival of a signal in accordance with the present invention. During processing the phase measurements in step 50 are used to determine groups or sets of conic line (cone angle) intersections using one conic line from each ambiguous phase measurement. Azimuth and elevation proximity is determined 52 for each group conic line intersections, and an azimuth and elevation are selected 54 and assigned to the group of conic lines nearest each other. To determine which conic lines are nearest each other, the conic line intersections of lines from different measurements are determined as initial distance determination reference points. For each intersection point in a group, a point to point distance to all other intersections in the group is determined and summed producing a total distance for that point. Each point to point distance determination determines the difference in azimuth between two intersection points and the difference in elevation between the two intersection points. The azimuth and elevation distances are summed to form the point to point distance between the two intersection points. The total distances for all the points in the group is summed to produce a group distance. The group distances for the candidate groups are compared and the group with the smallest group distance receives the elevation and azimuth assignment in step 54.

The processor 35 shown in FIG. 2, as a result, sets the output azimuth value equal to the average of the azimuth values on the conic lines and the output elevation value equal to the average of the elevation values on the conic lines corresponding to the group of conic lines spatially nearest each other in azimuth and elevation. In the presence of channel-pair phase error, this point may not exist on any of the curves.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of determining angle of arrival of signals at a rotating interferometer wheel having a boresight and rotating about an axis parallel to the boresight, said method comprising the steps of:
   (a) receiving signals at multiple roll angles of the interferometer wheel;
   (b) measuring frequency and phase differences of signals received at the multiple roll positions of the interferometer;
   (c) determining a set of conic angle intersections based on the measured phase difference at each of the multiple roll positions;
   (d) determining a set of azimuth and elevation angles based on the set of conic angle intersections; and
   (e) assigning as the angle of arrival an azimuth and elevation to a group of conic lines, one from each phase measurement, which are nearest each other.

2. A method according to claim 1, further comprising the steps of:
   calculating a set of possible unambiguous phase differences which could have yielded ambiguous measured phase differences for each of the multiple roll positions of the interferometer about the axis of rotation; and
   determining the set of conic angles based on the set of calculated phase differences.

3. An apparatus for ambiguity resolution in a rotating interferometer wheel having a boresight and rotating about an axis parallel to the boresight, comprising:
   means for measuring, at multiple roll positions of the interferometer about the axis, frequency and phase differences of signals received by the interferometer;
   means for determining groups of conic line intersections for each set of conic lines using one conic lines from each ambiguous phase measurement;
   means for determining azimuth and elevation proximity for each group of conic line intersections; and
   means for assigning as an angle of arrival an azimuth angle and an elevation angle to a group of conic lines, one from each phase measurement, which are nearest each other.

4. A method of determining angle of arrival of signals at a rotating interferometer wheel having a boresight and rotating about an axis parallel to the boresight, said method comprising the steps of:
   (a) receiving signals at multiple roll angles of the interferometer wheel;
   (b) measuring frequency and phase differences of signals received at the multiple roll positions of the interferometer;
   (c) determining a set of conic angle intersections based on the measured phase difference at each of the multiple roll positions;
   (d) calculating a set of possible unambiguous phase differences which could have yielded ambiguous measured phase differences for each of the multiple roll positions of the interferometer about the axis of rotation;
   (e) determining the set of conic angles based on the set of calculated phase differences;
   (f) determining a set of azimuth and elevation angles based on the set of conic angle intersections; and
   (g) assigning as the angle of arrival an azimuth and elevation to a group of conic lines, one from each phase measurement, which are nearest each other.

5. An apparatus for ambiguity resolution in a rotating interferometer wheel having a boresight and rotating about an axis parallel to the boresight, comprising:
   means for measuring, at multiple roll positions of the interferometer about the axis, frequency and phase differences of signals received by the interferometer;
   means for determining groups of conic line intersections for each set of conic lines using one conic lines from each ambiguous phase measurement;
   means for calculating a set of possible unambiguous phase differences which could have yielded ambiguous measured phase differences for each of the multiple roll positions of the interferometer about the axis of rotation;
   means for determining the set of conic angles based on the set of calculated phase differences;
   means for determining azimuth and elevation proximity for each group of conic line intersections; and
   means for assigning as an angle of arrival an azimuth angle and an elevation angle to a group of conic lines, one from each phase measurement, which are nearest each other.

* * * * *